Figure 8:
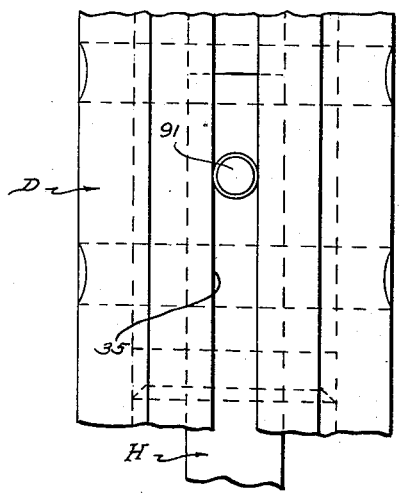

Aug. 17, 1954 J. L. DOOLEY 2,686,497
FLUID PRESSURE ACTUATED MECHANISM
Filed May 29, 1950 3 Sheets-Sheet 1
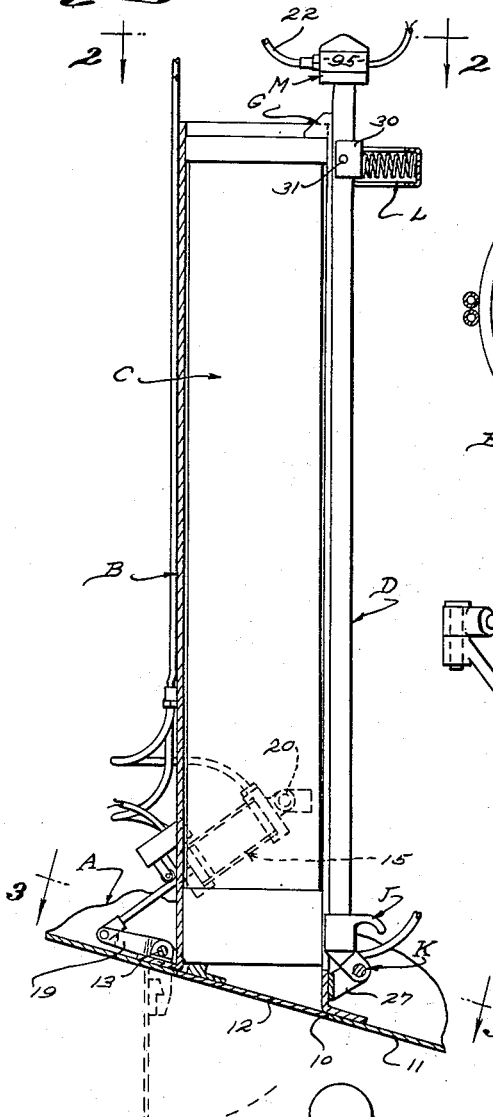
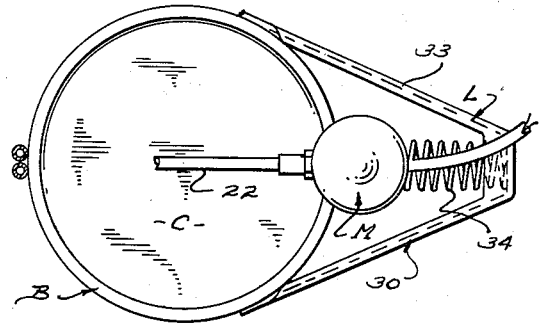
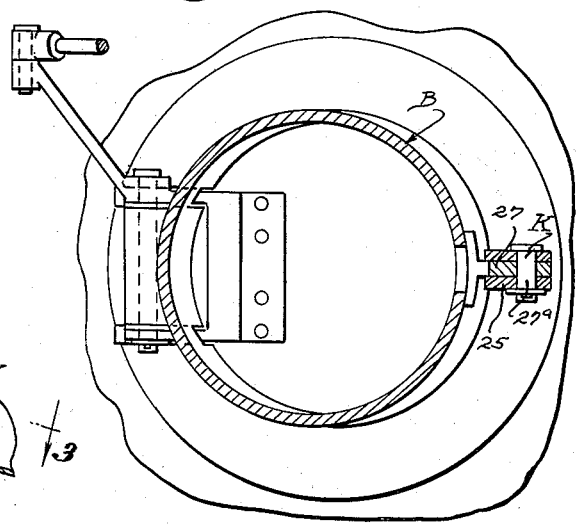
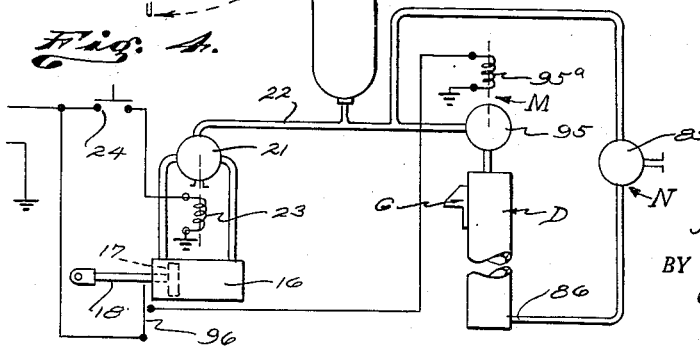
INVENTOR.
James L. Dooley
BY
Attorney

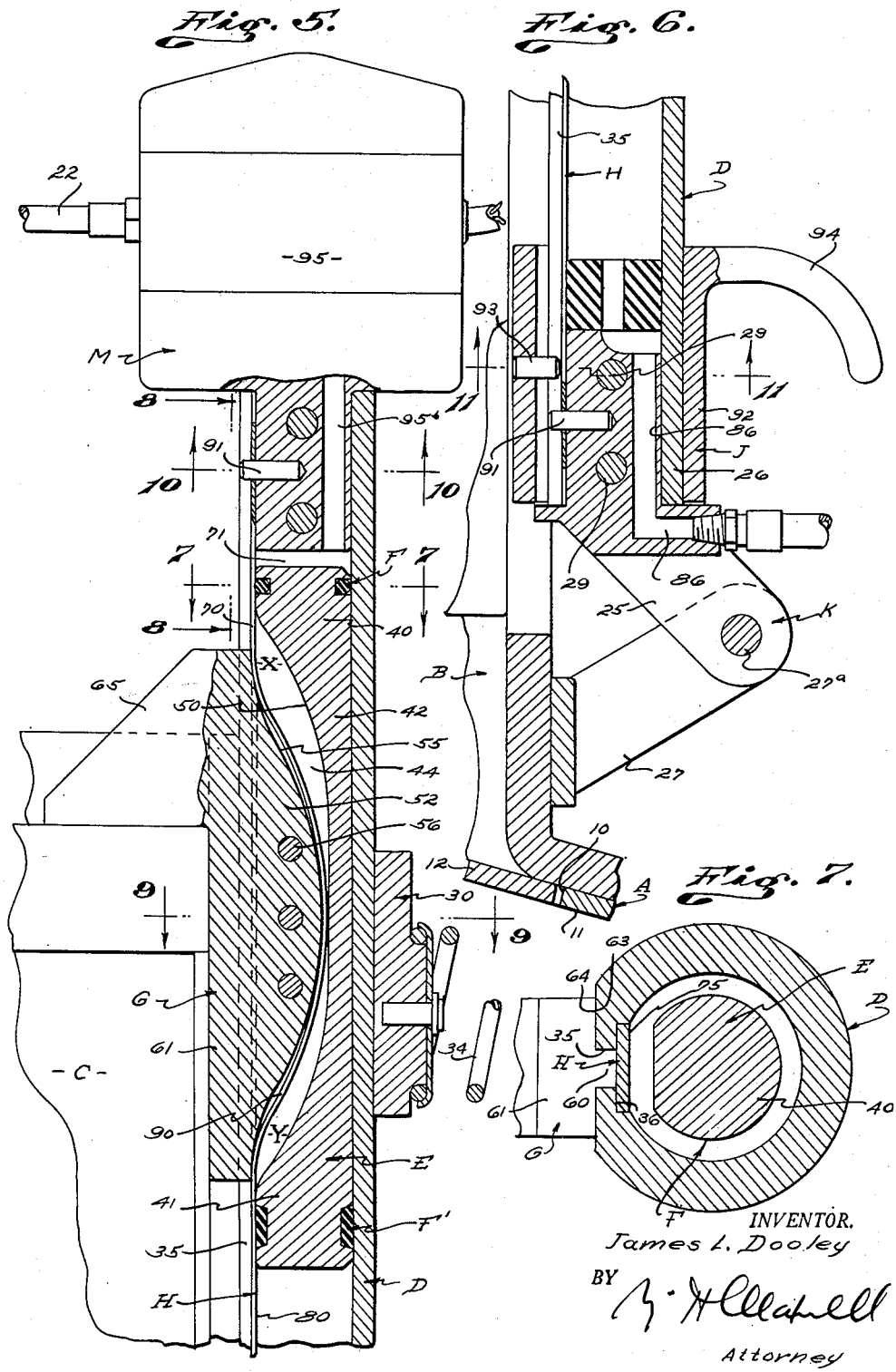

Aug. 17, 1954

J. L. DOOLEY 2,686,497

FLUID PRESSURE ACTUATED MECHANISM

Filed May 29, 1950

3 Sheets-Sheet 3

INVENTOR.
James L. Dooley
BY
*[signature]*
Attorney

Patented Aug. 17, 1954

2,686,497

UNITED STATES PATENT OFFICE 2,686,497

FLUID PRESSURE ACTUATED MECHANISM

James L. Dooley, Los Angeles, Calif., assignor to Rhodes Lewis Co., Los Angeles, Calif., a corporation of California Application May 29, 1950, Serial No. 164,919

2 Claims. (Cl. 121—1)

This invention relates to a fluid pressure actuated mechanism and it is a general object of the invention to provide a simple, practical, improved structure characterized by a cylinder and piston mechanism in which the piston is coupled to structure at the exterior of the piston without the use of the usual piston rod.

There are various situations where a cylinder and piston mechanism is desirable but is rendered impractical, inconvenient, or undesirable by reason of the usual piston rod that connects with the piston either to be actuated thereby or to cause actuation thereof. With the usual cylinder and piston mechanism wherein there is a piston rod attached to the piston and projecting from the cylinder at one end thereof, the overall length of the structure is usually substantially twice that of the cylinder and this is in many instances a limiting factor.

It is a general object of this invention to provide a cylinder and piston mechanism in which there is a cylinder with a longitudinal slot in one side thereof, a piston slidable in the cylinder and carrying a lateral projection that extends outwardly through the slot and a closure acting to close the slot beyond one or both of the ends of the piston to establish a fluid tight chamber at either or both ends of the piston.

Another object of this invention is to provide a mechanism of the general character referred to which involves but few simple, inexpensive parts which make for economical manufacture and dependable operation.

It is a further object of the invention to provide a mechanism in which a longitudinal guide carries an object which is to be ejected therefrom while a cylinder and piston mechanism adjoins the guide and is substantially coextensive therewith and has a laterally projecting part engaging the object in the guide to cause its operation.

Another object of the invention is to provide a mechanism of the general character referred to in which an object carrying guide has a cylinder and piston mechanism adjacent thereto and substantially coextensive therewith, which cylinder and piston mechanism is pivotally connected to the guide and is normally held in position where a lateral projection of the mechanism engages the object in the guide to operate it.

A further object of the invention is to provide a mechanism of the general character referred to in which an elongate object carrying guide is provided at one end with a pivoted closure and means operating the closure, while a cylinder and piston mechanism adjoins the guide to operate the object and is related to the closure so that the object is operated when the closure is open.

The present invention relates to improvements in mechanism for launching buoys, flares or other objects from aircraft and involves an elongate guide carrying an object so that it can be ejected therefrom and a hinged cover is provided at the discharge end of the guide and is normally closed to releasably retain the object in the guide. A cylinder and piston device operates the cover to swing it open. A cylinder and piston mechanism is arranged adjacent one side of the guide and is substantially coextensive therewith, one end of the cylinder being pivoted at one end of the guide while the other end of the cylinder is yieldingly held adjacent the guide. The cylinder and piston mechanism adjacent the guide is characterized by a cylinder closed at its ends and provided with a longitudinal slot in one side. A piston slides in the cylinder and has ends joined by a middle portion, which middle portion has a longitudinal passageway formed therein or therethrough, the passageway being inward of the periphery of the piston and having open ends confined to the middle portion of the piston or inward of the end portions of the piston. A lateral projection is joined to or carried by the piston being carried by the middle portion intermediate the open ends of the passageway. The projection extends outwardly through the slot in the cylinder and in the particular case illustrated it is such as to engage and operate the object in the guide. A closure is provided in the cylinder and is in the form of an elongate ribbon-like strip of flexible material, say, for instance, steel. The closure has end portions closing the slot of the cylinder at the end portions of the piston and outward therefrom to the ends of the cylinder, and it has an intermediate portion which is laterally offset or flexed to extend through the passage provided in the piston. Through this construction the closure by-passes the lateral projection that extends through the slot in the cylinder. In the preferred construction the cylinder is provided with a recess in the wall thereof at the slot and the closure seats in or is received by the recess. In the preferred construction the passageway is established in the middle portion of the piston by providing a recess therein from the periphery and by providing a section of the piston which enters and occupies the recess establishing the desired passageway and carrying the projection which extends through the slot of the piston.

Figure 9:
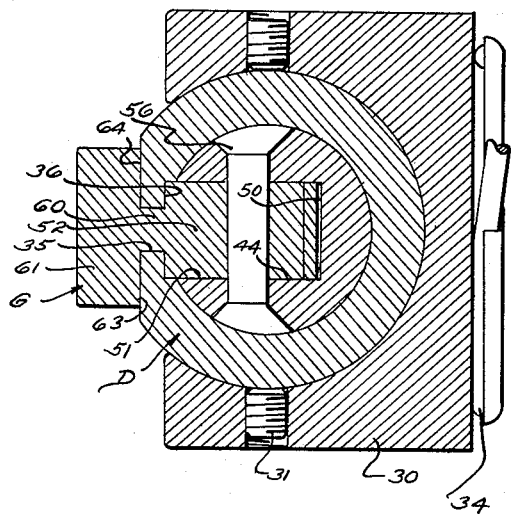
Figure 11:
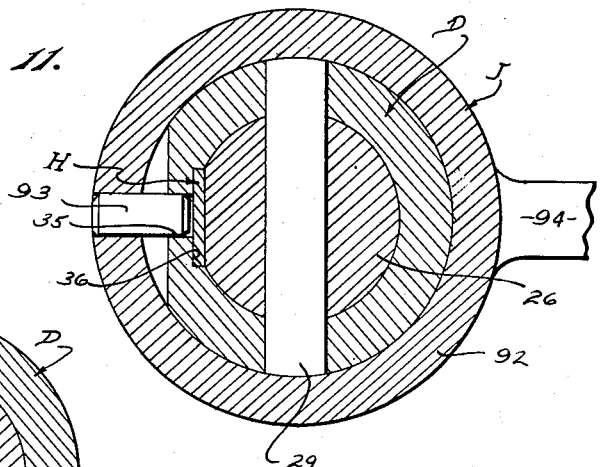
Figure 10:
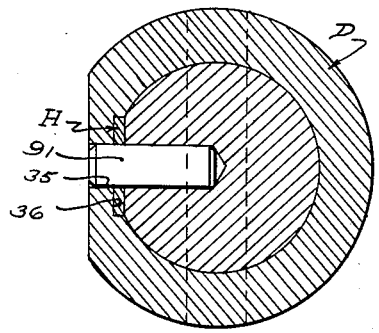

The various objects and features of my invention will be fully understood from the following detailed description of a typical preferred form and application of the invention, throughout which description reference is made to the accompanying drawings, in which:

Fig. 1 is a sectional view of a portion of an aircraft showing a structure embodying the present invention applied thereto which structure involves, generally, an object carrying guide equipped with a cover and an operating mechanism therefor, while a cylinder and piston mechanism adjoins the guide to operate the object therein. Fig. 2 is an enlarged view taken substantially as indicated by line 2—2 on Fig. 1. Fig. 3 is an enlarged view taken substantially as indicated by line 3—3 on Fig. 1. Fig. 4 is a diagrammatic view illustrating the control system that may be employed in connection with the structure of the present invention. Fig. 5 is an enlarged vertical view taken at the upper end portion of the cylinder and piston mechanism showing parts in section to illustrate details of construction. Fig. 6 is an enlarged vertical sectional view taken at the lower end portion of the cylinder and piston mechanism. Fig. 7 is a detailed transverse sectional view taken as indicated by line 7—7 on Fig. 5. Fig. 8 is an enlarged detailed view taken as indicated by line 8—8 on Fig. 5. Fig. 9 is an enlarged detailed transverse sectional view taken as indicated by line 9—9 on Fig. 5. Fig. 10 is an enlarged detailed transverse sectional view taken as indicated by line 10—10 on Fig. 5, and Fig. 11 is an enlarged detailed sectional view taken as indicated by line 11—11 on Fig. 6.

Various aspects of the present invention are applicable, generally, to cylinder and piston mechanisms, for instance, to situations where a piston is operated by fluid pressure in a cylinder and is utilized to drive or operate structure at the exterior of the cylinder, or where structure at the exterior of the cylinder is employed to drive a piston in a cylinder to act in fluid therein. In the present disclosure the invention is illustrated as applied to a structure wherein an object is normally held in such manner as to be ejected when the cylinder and piston mechanism is operated. Though this particular mechanism is described in detail and the cylinder and piston mechanism is described in a form suitable for this particular mechanism, the broader aspects of the invention are not to be considered as limited thereby.

In the drawings a portion of an aircraft or like structure is indicated at A and a guide B is mounted to register with an opening 10 provided in a sheet or skin element 11 of the structure A. The guide is shown as slidably supporting or carrying an object C, such as a buoy, which is to be ejected through the opening 10 and in the specific case illustrated the guide is a simple tube in which the object is slidably carried.

A cover 12 is provided at the discharge end of the guide B so as to normally close the opening 10 and the cover may also serve as a means of normally retaining the object in the guide. In the particular case illustrated the cover 12 is pivotally supported through a suitable pivot member 13. A fluid pressure actuated means 15 is provided for operating the cover 12 as from the closed position to an open position such as indicated in dotted lines in Fig. 1. The particular mechanism 15 shown in the drawings involves a cylinder 16 carrying a piston 17 and a rod 18 connects the piston 17 with an arm 19 projecting from the cover. The cylinder 16 is pivotally carried by a suitable pivotal support 20 so that the mechanism may shift or vary as to angle as it operates. A suitable valve 21 controls flow of operating fluid from a pressure supply line 22 to the mechanism 16 and in the case illustrated the valve is electrically controlled as through an operating coil 23. The coil 23 is in a suitable operating circuit under control of a manually operated switch 24.

The present invention provides a cylinder and piston mechanism for operating the object C in the guide B so that it is ejected therefrom when the cover 12 is open. The particular cylinder and piston mechanism illustrated in the drawings involves, generally, a cylinder D, a piston E slidably carried in the cylinder, sealing means F and F' at the end portions of the piston, a projection G on one side of the middle portion of the piston and projecting laterally therefrom to extend out through a slot in one side of the piston and a closure H cooperating with the cylinder and piston and closing the cylinder slot from the end portions of the piston at the ends of the cylinder. In the particular case illustrated a suitable control valve controls flow of operating fluid to one end of the cylinder D and a manual operating element J is provided for shifting the piston longitudinally in the cylinder.

The cylinder and piston mechanism just referred to may be mounted adjacent or in connection with the guide or other structure in any suitable manner. In the particular case illustrated it is mounted adjacent one side of the guide and it is substantially coextensive with the guide as appears in Fig. 1 of the drawings. In this particular case one end of the cylinder D is connected to or with the guide B at one end thereof through a pivotal mounting K while the other end is normally yieldingly held adjacent the guide B by a suitable means L.

The particular mounting means K shown in the drawings involves a bracket 25 projecting from a closure 26 that closes the lower end of the cylinder D. A bracket 27 projects from the lower end of guide B and a pivot pin 27ª pivotally connects brackets 25 and 27. In this particular case the closure 26 for the lower end of the cylinder is in the form of a plug which is entered in the lower end of the cylinder and is retained therein by suitable pins 29.

The means L is shown located at the upper end portion of the cylinder D and involves a bracket 30 secured on the exterior of the cylinder as by set screws 31 or the like. A yoke 33 mounted on the exterior of the guide B at the upper end portion thereof supports a compression spring 34 which bears on bracket 30 so that the upper end portion of the cylinder D is normally yieldingly urged toward the upper end portion of the guide B to bear on the side thereof.

The cylinder D in its preferred form is a simple tubular member of suitable size and wall thickness and in accordance with the invention it is characterized by a longitudinal slot 35 that extends longitudinally of the cylinder from one end portion to the other. In the particular case illustrated the slot 35 extends the entire length of the cylinder and is uniform in size and shape throughout its length, being a narrow slot with flat parallel side walls as clearly shown in the drawings. In the preferred form of the invention the cylinder is provided with a recess 36 in its inner wall, which recess occurs at the slot and is somewhat wider than the slot and corresponds in size and shape with the closure G.

The piston E is slidably carried in the cylinder D and in practice it is desirable that it be of substantial length. The piston in its preferred form has several distinct portions or sections. For example, it may have end portions 40 and 41 joined to or at the ends of a middle portion 42. The middle portion of the piston is characterized by an elongate passageway 44 which is generally arcuate in form and has end portions X and Y open at one side of the piston immediately inward of or adjacent the end portions 40 and 41, respectively. The middle portion of the passageway is laterally removed or offset from the side of the piston where the passage opens, being removed a substantial distance from this side of the piston as appears in Fig. 5 of the drawings. In practice the desired passage 44 can be formed in the middle portion of the piston in various manner. In the particular case illustrated a recess or cavity is established in the side of the middle portion from the periphery thereof and is formed to have a generally concave bottom 50 and flat parallel sides 51. A section 52 of the middle portion of the piston, which may be formed separately from the other parts thereof, is inserted in the recess from the exterior of the piston and has a generally convex inner face 55 which opposes or faces the bottom 50 of the said cavity but is spaced therefrom to leave the desired passage 44. When this construction is employed the section 52 that is inserted in the recess may be in the nature of a block and it may be rigidly joined to the other parts of the piston, as by suitable fasteners 56, or the like. It is to be understood that the section 52 may if desired be formed integrally with the portion 42 of the piston as by casting or the like. The particular fasteners 56 illustrated in the drawings are rivets which when in place so join the section 52 to the other parts or portions of the piston as to be a rigid unit therewith. In the particular case illustrated the bottom 50 of the said recess and the face 55 are so spaced and related that the passageway 44 has wide or large open ends X and Y where the closure G enters and leaves the piston.

The projection G is carried by or joined to the section 52 of the piston and projects outwardly therefrom or laterally of the piston so that it extends outwardly through the slot 35 provided in the cylinder. The projection G has a neck portion 60 that slidably fits the slot 35 while a head portion 61 is carried by the neck portion at the exterior of the cylinder and is in the nature of an enlargement with faces 63 that slidably engage or bear upon faces 64 provided at the exterior of the cylinder. In the particular case illustrated a finger 65 projects from the portion 61 of the projection G and when the parts are in the normal position, as shown in the drawings, the finger 65 overlies the upper end of the object C so that when the piston is operated downwardly in the cylinder D the object C is ejected from the cylinder.

The closure H provided by the present invention is carried in the cylinder D and is an elongate flexible ribbon or strap-like member preferably a ribbon or band of steel, or the like, and it extends from one end portion of the cylinder D to the other, and in so doing it extends through the passage 44 provided in piston E. In accordance with the invention the closure H has an open end portion 70 which seats in the cylinder from the end portion 40 of the piston outwardly or upwardly therefrom to the upper end portion of the cylinder to close the slot 35 of the cylinder from the end portion 40 of the piston to the upper end portion of the cylinder, thus establishing a chamber 71 in the cylinder above the piston, which chamber is closed to be pressure tight. In the preferred form of the invention the strip or strap forming the closure H is substantially rectangular in cross sectional configuration, as shown in Figs. 7, 9, 10 and 11 of the drawings, and the recess 36 in the cylinder wall is correspondingly shaped and receives the closure so that the inner face 75 thereof has edges that adjoin the cylindrical wall of the cylinder at the sides of the recess 36, as clearly shown in Fig. 7 of the drawings. The closure H is a metal ribbon of such size with relation to the recess 36 that the edges of its inner surface meet the inner surface of the cylinder in such a manner that a line inscribed transversely of the inner face of the ribbon will be a chord of the circle defined by the inner surface of the cylinder D, as clearly shown in Fig. 7. The end portion 40 of the piston which occurs within the end portion 70 of the closure H is round in cross section to fit the cylindrical wall except at the side facing the closure H where it is flattened to correspond to the face 75 of the closure.

The sealing means F carried by the end portion 40 of the piston corresponds in shape with the cross sectional configuration of the piston portion 40 to effectively seal between the end portion 40 of the piston, the cylinder wall and the closure.

The closure has a lower end portion 80 that seats in the cylinder within the lower end portion 41 of the piston and outward thereof or from there to the lower end of the cylinder. This portion of the closure corresponds with the portion 70 above described and seats in the recess 36 in the manner shown in Fig. 7 of the drawings. The sealing means F' shown in Fig. 5 of the drawings seals between the end portion 41 of the piston and the cylinder and closure. In the particular case illustrated the sealing means F is shown as a so-called O-ring whereas the sealing means F' is a packing ring substantially rectangular in cross sectional configuration. It will be apparent that various sealing constructions may be employed, as circumstances require.

The closure H has a middle portion 90 which is flexed from the plane in which the end portions 70 and 80 occur, the middle portion 90 being flexed or offset inwardly in the cylinder to occur in or pass through the passage 44 provided in the piston. From Fig. 5 of the drawings it will be apparent how the middle portion 90 of the closure is flexed or bent to extend through the passageway 44 and it will be apparent that as the piston operates longitudinally in the cylinder various portions of the closure act as or form the middle portion 90, while the end portions 70 and 80 of the closure vary in length.

The closure 80 may be mounted or anchored in the structure in any suitable manner. In the particular case illustrated the closure strip is anchored at both ends of the cylinder where it is held on pins 91 projecting from the plug-like closures that close the ends of the cylinder. It will be apparent that the closure strip when of suitable length is such as to have the desired middle portion 90 which bows into the piston to pass through the passage 44 in the manner shown throughout the drawings.

In the particular mechanism illustrated a manual operating member J is provided for manually moving the piston to the upper end portion of the cylinder. The member J involves a sleeve 92 slidable on the cylinder D and retained against rotation by a pi 93 that operates in the slot provided in the cylinder. A finger piece 94 projects from the sleeve so that the sleeve can be conveniently gripped for operation.

In the particular mechanism illustrated a means N is provided for controlling supply of operating fluid to and from the lower end of the cylinder. Means M is shown as including a port or passage 86 in or through closure 26 at the lower end of the cylinder and a suitable valve 85 controlling flow of operating fluid through the port 86. The fluid may be supplied from the supply line 22. The valve 85 is connected to the cylinder through the closure 26 at the lower end of the cylinder. Valve 85 may have two positions, one in which the cylinder is open to the atmosphere and the other in which fluid pressure is admitted to the cylinder from line 22.

Means M controlling supply of operating fluid to the upper end of cylinder D in the case illustrated controls the flow of operating fluid to and from the upper end of the cylinder and is in the form of a suitable valve 95 provided with an operating coil 95ª. The particular valve 95 illustrated in the drawings is carried by the closure which closes the upper end of the cylinder D. The valve controls passage of fluid through a port 95ᵇ in the closure 26 at the upper end of the cylinder.

In the control system provided by the present invention the valve 95 controls flow of operating fluid from the supply line 22 to the upper end of cylinder D. The control system, in the particular case illustrated, has the operating coil 95ª of valve 95 connected in a circuit controlled by a switch 96 which is closed by the action of operating mechanism 15 when the cover 12 is moved to a fully open position. Through this arrangement, when the switch 24 is closed the cover 12 is first opened and then when the cover has reached a fully open position the valve 95 is operated so that fluid is supplied under pressure to the upper end of cylinder D. Fluid under pressure in the upper end of cylinder D forces the piston E downwardly in the cylinder and as the piston thus operates the finger engaging the object C forces the object out of the guide B. When the piston thus operates downwardly, fluid beneath the piston is exhausted through the means N. In this case the valve 85 is open to atmosphere and flow is out through port 86 and valve 85.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. In a mechanism of the character described: a cylinder having a flat longitudinal recess in its inner face and a slot in the bottom of the recess, which slot communicates with the exterior of the cylinder; a flat untensioned closure ribbon extending from end to end of said recess and being substantially the same width as said recess, the edges of the inner surface of said ribbon meeting the inner surface of said cylinder so that a transverse line across said inner surface of said ribbon will be a chord of the circle defined by the inner surface of said cylinder, said ribbon having a portion deflected toward the axis of said cylinder; a piston in said cylinder having aligned chordal, flat surfaces at the ends thereof confronting the inner surface of said ribbon, said piston having in its side a longitudinally elongated cavity aligned with said chordal surfaces and being of a width substantially equal to the width of said recess, said cavity having an effectively flat bottom, a block extending into said cavity and being secured therein, said block having a width corresponding to the width of said cavity and said recess and defining in said cavity a passageway for said deflected portion of said ribbon from a point near one end to a point near the other end of said piston, said block having an inner face disposed in such relation to said bottom of said cavity that the middle of the passage is of a thickness not materially greater than the thickness of said ribbon and the ends of said cavity of greater thickness than said middle thereof, said block extending from said cavity into said recess and filling the same; a neck extending from said block through said slot for connection to a member to be moved; and means for delivery of fluid to said cylinder to move said piston therein.

2. In a mechanism of the character described: a cylinder having a flat longitudinal recess in its inner face and a slot in the bottom of the recess, which slot communicates with the exterior of the cylinder; a flat closure ribbon extending from end to end of said recess and being substantially the same width as said recess, the edges of the inner surface of said ribbon meeting the inner surface of said cylinder so that a transverse line across said inner surface of said ribbon will be a chord of the circle defined by the inner surface of said cylinder, said ribbon having a portion deflected toward the axis of said cylinder; a piston in said cylinder having aligned chordal, flat surfaces at the ends thereof confronting the inner surface of said ribbon, said piston having in its side a longitudinally elongated cavity aligned with said chordal surfaces and being of a width substantially equal to the width of said recess, a block extending into said cavity and being secured therein, said block having a width corresponding to the width of said cavity and said recess and defining in said cavity a passageway for said deflected portion of said ribbon from a point near one end to a point near the other end of said piston, said block extending into said recess and comprising a neck portion which extends through said slot for connection to a member to be moved; and means for delivery of fluid to said cylinder to move said piston therein.

References Cited in the file of this patent

UNITED STATES PATENTS

| Number | Name | Date |
|---|---|---|
| 868,946 | Smulders | Oct. 22, 1907 |
| 958,650 | Kimbrell | May 17, 1910 |
| 2,109,128 | Carrillo | Feb. 22, 1938 |
| 2,200,427 | Merz | May 14, 1940 |
| 2,301,028 | Esch | Nov. 3, 1942 |
| 2,373,455 | Carey | Apr. 10, 1945 |
| 2,473,430 | Hoffar | June 14, 1949 |
| 2,484,844 | Nicholas | Oct. 18, 1949 |
| 2,502,487 | Scholl | Apr. 4, 1950 |
| 2,550,887 | Tratch | May 1, 1951 |

FOREIGN PATENTS

| Number | Country | Date |
|---|---|---|
| 470,088 | Great Britain | Aug. 3, 1937 |